(No Model.)
D. C. VAN BRUNT.
CULTIVATOR.
No. 280,263. Patented June 26, 1883.
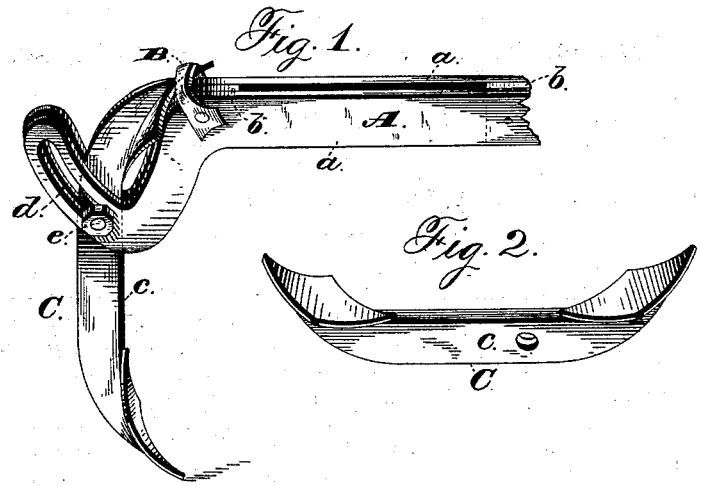
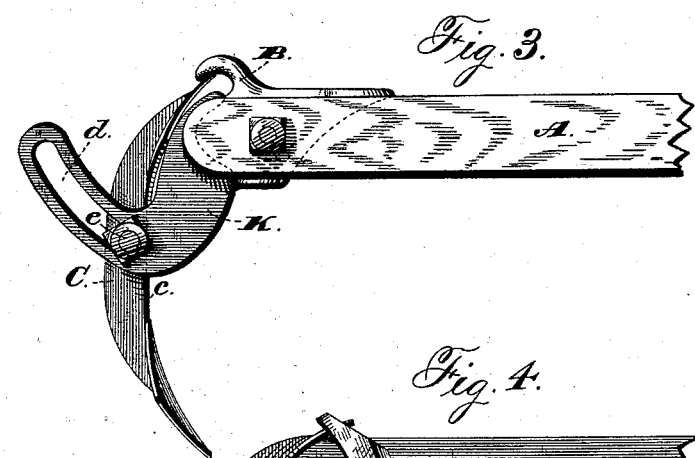
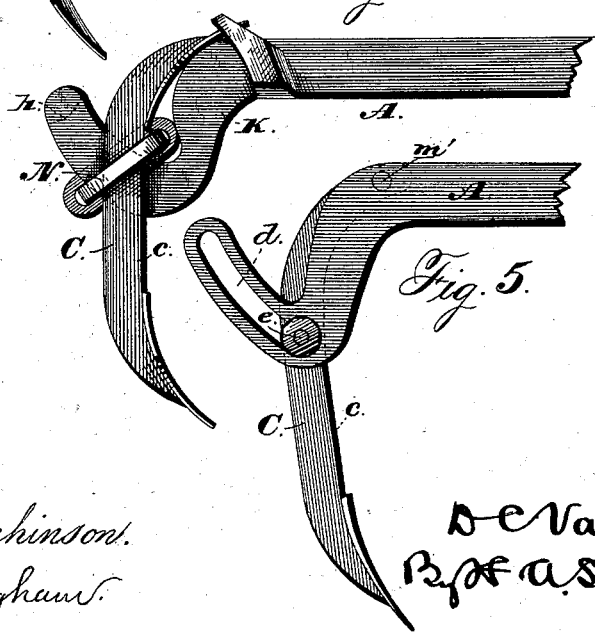
WITNESSES
Jas. E. Hutchinson
S. G. Nottingham
INVENTOR
D C Van Brunt
By H A Symon
Attorney

UNITED STATES PATENT OFFICE.

DANIEL C. VAN BRUNT, OF HORICON, WISCONSIN.

CULTIVATOR.

SPECIFICATION forming part of Letters Patent No. 280,263, dated June 26, 1883.

Application filed March 29, 1883. (No model.)

*To all whom it may concern:*

Be it known that I, DANIEL C. VAN BRUNT, of Horicon, in the county of Dodge and State of Wisconsin, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, the object of the same being to provide strong and durable means for detachably securing a double-pointed tooth to a drag-bar in such a manner as to withstand a predetermined amount of pressure, which pressure, if exceeded, will cause the tooth to slip and allow it to ride over obstructions without damaging the parts; and with these ends in view my invention consists in the parts and combinations of parts, as will be more fully described, and pointed out in the claims.

In the accompanying drawings, Figure 1 is a view in perspective of my improvement with a double-pointed tooth secured thereto. Fig. 2 is a perspective view of the tooth, and Figs. 3, 4, and 5 represent modifications.

A represents a cultivator-beam, preferably formed of the two parallel metallic bars A, rigidly secured together and held in proper relative positions by the blocks *b*. This beam is also provided, near its rear end, with the metallic clip or loop B, adapted to receive and hold the upper end of the double-pointed tooth C in its proper position. The rear ends of both bars *a*, composing the beam A, are curved downwardly to form a rest for the upper point of the tooth C, and then rearwardly and upwardly in the arc of a circle to admit of the clamping thereto of the shank *c* of the tooth in any desired angle. The rear curved end of each bar *a* is provided with a slot, *d*, in which the bolt *e* is adapted to move. This bolt, which secures the tooth to the beam, passes through the slots in the two bars composing the beam, and through the shank of the tooth situated between the bars, and is held in position by a nut screwed on one end of the said bolt. By means of the slots *d* the tooth M can be adjusted to any desired angle, and by simply tightening the nut the tooth is held in position and performs its functions in the ordinary manner, and is adapted to withstand a certain or predetermined pressure. If this pressure should be exceeded, as would be the case when the tooth struck a rock or a large root, the tooth would slip or yield and ride over the obstruction without damaging any of the parts. The clip B, before referred to, is designed principally to prevent the tooth from moving laterally, and also prevent a retrograde movement thereof when the machine is backed.

The tooth C consists of a central shank and single or double points, the latter being formed integral with or detachable from the shank, as desired. This tooth, when provided with double points, is adapted to be reversed, and when secured in position to the beam one point thereof rests above and is protected by the said beam.

Instead of making the beam A of two metallic bars, as shown in Fig. 1, it can be made of iron and wood combined, as shown in Fig. 3. In this latter construction the beam proper is made of wood, and provided at its rear end with an open slot, into which the front end of the metallic arm K is secured by suitable bolts. This arm K is curved and slotted, substantially like those shown in Fig. 1, and is provided on its upper surface with the clip B, formed integral therewith or separate therefrom, as desired.

In the modification shown in Fig. 4 the slot *d* and the bolt *e* are dispensed with, and the tooth secured to the arm K by the clip N, which latter is clamped diagonally around the arm K and the shank of the tooth. When this manner of fastening the tooth to the arm is employed, the arm is provided on one or both sides, at its outer end, with a lug or lugs, *h*, adapted to prevent the clip from slipping off. This latter construction can be employed with the metal beam, or with the combined metal and wood beam, as desired.

In all of the devices shown the tooth is clamped to the rear end of the beam, with the face of the upper or unused point resting against the upper or back edge of the beam. The upper point of the tooth is held in position and shielded by the clip B, while the lower point can be moved backward or forward upon the arm or arms K, thus giving it the desired angles for various soils, and upon meeting an obstruction will slide backward, thereby preventing breakage.

In Fig. 5 I have shown a single-pointed tooth, M, pivotally secured to the beam by a bolt, $m'$. When this form is used the holder H is dispensed with.

The beams or bars herein shown and described may be made of wood with the iron extension, or wholly of iron, with the tooth clamped between or on the rear arms or arm thereof, without departing from the spirit of my invention; and hence I would have it understood that I do not confine myself to any one particular construction, but consider myself at liberty to make such changes and alterations as fairly fall within the spirit and scope of my invention.

Having fully described my invention, what I claim as new, and desire to secure by Letters Patent, is—

1. The combination, with a cultivator-beam provided at its rear end with a curved arm rigidly secured thereto, of a slip-tooth clamped to the said curved arm, with its upper end resting on or getting its support from the rear end of the beam, substantially as set forth.

2. The combination, with a cultivator-beam having a slotted curved arm (one or more) rigidly secured to its rear end, of a slip-tooth clamped to said curved arm or arms, the upper end of the tooth being held against displacement, substantially as set forth.

3. The combination, with a cultivator-beam having a slotted curved arm (one or more) rigidly secured to the rear end of the beam, and a clip or loop, of a double-pointed slip-tooth, one end of which engages in a clip or loop, while its shank is clamped to the curved arm or arms, substantially as set forth.

In testimony whereof I have signed this specification in the presence of two subscribing witnesses.

DANIEL C. VAN BRUNT.

Witnesses:
  W. S. BILLINGHURST,
  WM. R. ST. JOHN.